(12) United States Patent
Braun

(10) Patent No.: US 8,922,963 B2
(45) Date of Patent: Dec. 30, 2014

(54) ELECTROSTATIC DISCHARGE PROTECTION CIRCUIT AND METHOD THEREOF

(71) Applicant: Monolithic Power Systems, Inc., San Jose, CA (US)

(72) Inventor: Eric Braun, Mountain View, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 123 days.

(21) Appl. No.: 13/754,814

(22) Filed: Jan. 30, 2013

(65) Prior Publication Data

US 2014/0211349 A1 Jul. 31, 2014

(51) Int. Cl.
*H02H 9/04* (2006.01)

(52) U.S. Cl.
CPC .................................... *H02H 9/042* (2013.01)
USPC ............................................................ 361/56

(58) Field of Classification Search
CPC ......... H02H 3/00; H02H 9/04; H01L 27/0266
USPC ............................................................ 361/56
See application file for complete search history.

(56) References Cited

U.S. PATENT DOCUMENTS

| 2005/0134295 A1* | 6/2005 | Blumenthal ................... 324/677 |
| 2009/0195951 A1* | 8/2009 | Sorgeloos et al. ............... 361/56 |

* cited by examiner

*Primary Examiner* — Scott Bauer
(74) *Attorney, Agent, or Firm* — Perkins Coie LLP

(57) ABSTRACT

An ESD protection circuit has a clamp control circuit and a clamp switch. The clamp switch has a first terminal, a second terminal and a control terminal, wherein the first terminal is coupled to a first node, and the second terminal is coupled to a second node. The clamp control circuit is coupled between the first node and the second node, wherein the clamp control circuit is configured to detect the rising time of the voltage between the first node and the second node, and to provide a clamp control signal to the control terminal of the clamp switch based on the rising time, if the rising time is shorter than a first time threshold, the clamp switch is turned ON for a second time threshold, and wherein the first time threshold is shorter than the second time threshold.

3 Claims, 5 Drawing Sheets

ELECTROSTATIC DISCHARGE PROTECTION CIRCUIT AND METHOD THEREOF

TECHNICAL FIELD

The present invention generally relates to electronic circuits, and more particularly but not exclusively to electrostatic discharge protection circuits and methods thereof.

BACKGROUND

In integrated circuits, an electrostatic discharge (ESD) protection circuit is required to detect an ESD event and to turn ON a clamp device until the end of the ESD event. FIG. 1 schematically illustrates a prior ESD protection circuit 100. As shown in FIG. 1, the ESD protection circuit 100 comprises a clamp control circuit 103 and a clamp switch 104. The clamp control circuit 103 is coupled between a node 101 and a node 102. The clamp control circuit 103 is configured to detect an ESD event based on the rising time of a fast rising voltage signal (such as the voltage $V_{AB}$ shown in FIG. 1. Typically, the rising time of $V_{AB}$ in an ESD event is 10~100 ns. When an ESD event is detected, the clamp control circuit 103 generates a clamp control signal vg to turn ON the clamp switch 104 for a predetermined time period. Because the rising time of $V_{AB}$ in a power-up event is in millisecond range which is much longer than the rising time in an ESD event, the clamp control circuit 103 can distinguish the two events based on the rising time.

In the prior art shown in FIG. 1, the clamp control circuit 103 will detect an ESD event and turn ON the clamp switch 104 if the rising time of $V_{AB}$ is shorter than a time threshold τ1, and the ON-time of the clamp switch 104 is equal to the time threshold τ1. In order to ensure that the clamp switch 104 be turned ON during the entire ESD duration, the time threshold τ1 should be long enough, typically for 1 μs.

However, in some applications, operations such as "hot-swap" may result in a very fast rising time of $V_{AB}$, typically a few microseconds or even hundreds of nanoseconds. False triggering of the clamp switch 104 may occur in such operations.

SUMMARY

Embodiments of the present invention are directed to an electrostatic discharge protection circuit comprising a clamp switch and a clamp control circuit. The clamp switch has a first terminal, a second terminal and a control terminal, wherein the first terminal is coupled to a first node, and the second terminal is coupled to a second node. The clamp control circuit is coupled between the first node and the second node, wherein the clamp control circuit is configured to detect the rising time of the voltage between the first node and the second node, and to provide a clamp control signal to the control terminal of the clamp switch based on the rising time. When the rising time is shorter than a first time threshold, the clamp switch is turned ON for a second time threshold, and wherein the first time threshold is shorter than the second time threshold.

BRIEF DESCRIPTION OF THE DRAWINGS

The present invention can be further understood with reference to the following detailed description and the appended drawings, wherein like elements are provided with like reference numerals. The drawings are only for illustration purpose. Usually, these drawings are not necessarily drawn to scale. The relative length illustrated by the drawings may differ from the relative length depicted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Embodiments of the present invention provide an improved ESD protection circuit comprising a clamp switch and a clamp control circuit. The clamp switch has a first terminal, a second terminal and a control terminal, wherein the first terminal is coupled to a first node, and the second terminal is coupled to a second node. The clamp control circuit is configured to generate a clamp control signal to the control terminal of the clamp switch. The clamp control circuit utilizes separate time thresholds for ESD detection and ON-time control, wherein a first time threshold τ1 is designed for a desired ESD detection range, e.g. 100 ns, and a second time threshold τ2 is designed to keep the clamp switch ON during the expected maximum duration of an ESD event, e.g.

1 µs. When the rising time tr of the voltage between the first node and the second node is shorter than the first time threshold $\tau 1$, the clamp control signal turns ON the clamp switch and keeps the clamp switch ON for the second time threshold $\tau 2$. The operations of the improved ESD protection circuit in accordance with the embodiments of the present invention are summarized in the table below compared with that of the prior art.

| Voltage rising time tr | ON-time of the clamp switch | |
| --- | --- | --- |
| | Prior art | Embodiments of the present invention |
| $0 < tr < \tau 1$ | $\tau 2$ | $\tau 2$ |
| $\tau 1 < tr < \tau 2$ | $\tau 2$ | x |
| $tr > \tau 2$ | x | x |

The prior ESD detection range is unnecessarily wide and may cause false triggering during the hot-swap event. It can be seen that the improved ESD protection circuit can guarantee the ESD detection and improve the immunity to false triggering at the same time.

Figure 1:
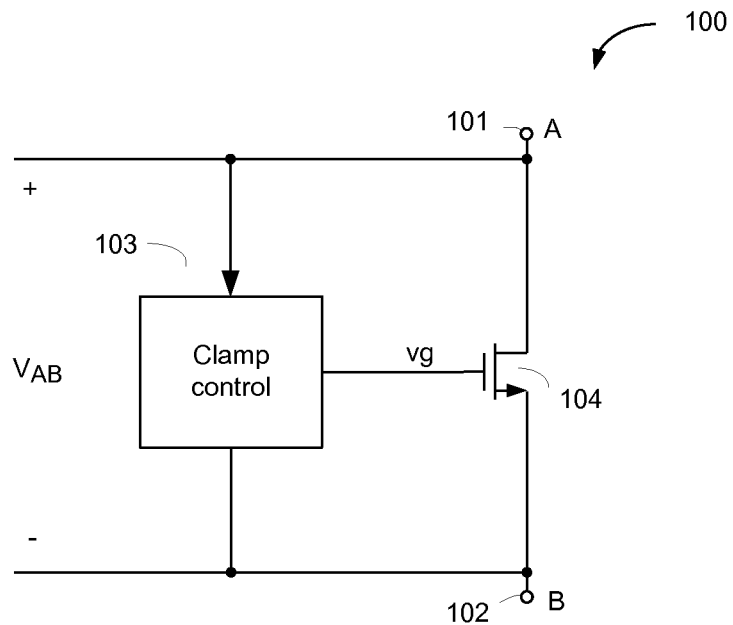
FIG. 1 schematically illustrates a prior ESD protection circuit 100.
Figure 2:
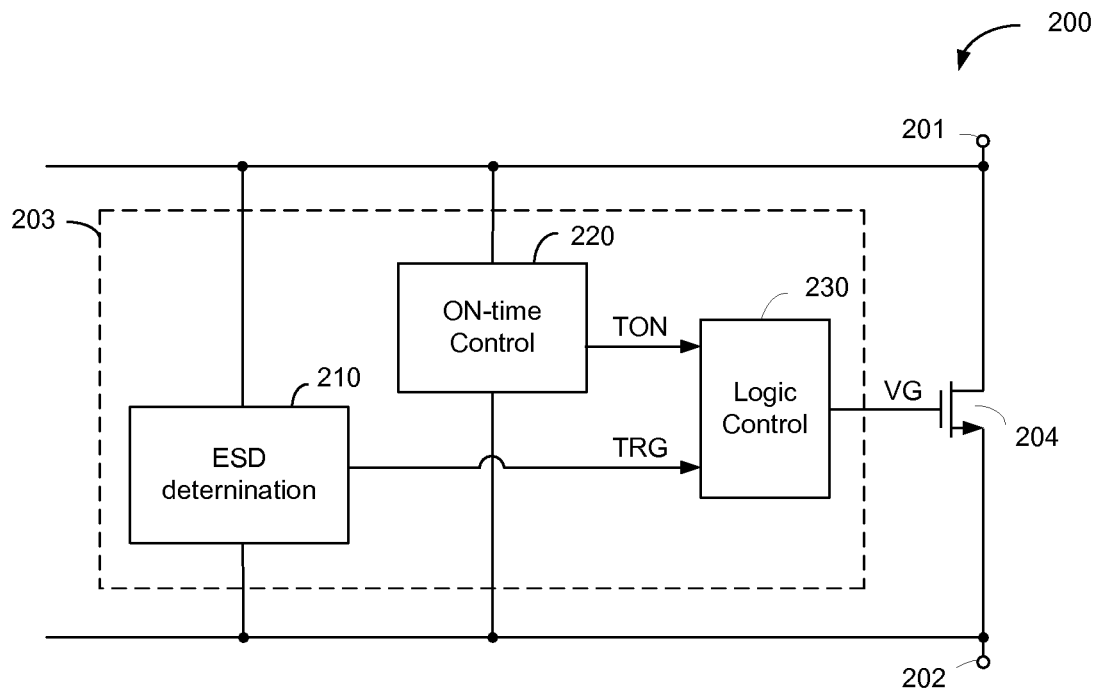
FIG. 2 schematically illustrates an ESD protection circuit 200 in accordance with an embodiment of the present invention.

FIG. 2 schematically illustrates an ESD protection circuit 200 in accordance with an embodiment of the present invention. The ESD protection circuit 200 comprises a clamp switch 204 and a clamp control circuit 203. The clamp switch 204 is configured to provide a discharge path between a node 201 and a node 202 when an ESD event occurs. The clamp switch 204 has a first terminal, a second terminal and a control terminal, wherein the first terminal is coupled to the node 201, and the second terminal is coupled to the node 202. In the embodiment shown in FIG. 2, the clamp switch 204 comprises a NMOS transistor. It should be noted that the clamp switch 204 may comprise any other controllable switch, as would be understood by one of ordinary skill in the art. In one embodiment, the clamp switch 204 may include field effect transistors (FET), metal oxide semiconductor field effect transistors (MOSFET), driver metal oxide semiconductor field effect transistors (DrMOS), Bipolar transistor, etc.

In one embodiment, the node 201 is configured as a power supply pin and the node 202 is configured as a ground pin. But this is not intended to be limiting and persons of skill in the art will understand that the structures and principles taught herein also apply to other pins. For convenience of explanation, in the following description, "the rising time" is used to represent the rising time of the voltage between the node 201 and the node 202.

In the embodiment as shown in FIG. 2, the clamp control circuit 203 comprises an ESD determination circuit 210, an ON-time control circuit 220 and a logic control circuit 230. The ESD determination circuit 210 is coupled between the node 201 and the node 202. The ESD determination circuit 210 is configured to detect the rising time of the voltage between the node 201 and the node 202, and to generate a trigger signal TRG at its output terminal. The trigger signal TRG is used to indicate whether an ESD event occurs. An ESD event will be detected if the rising time is shorter than the first time threshold $\tau 1$.

The ON-time control circuit 220 is coupled between the node 201 and the node 202. The ON-time control circuit 220 is configured to generate an ON-time signal TON to control the ON-time of the clamp switch 204. The ON-time of the clamp switch 204 is designed to be equal to the second time threshold $\tau 2$, so as to discharge the ESD energy.

The logic control circuit 230 is configured to generate a clamp control signal VG to the control terminal of the clamp switch 204. The logic control circuit 230 has a first input terminal, a second input terminal and an output terminal, wherein the first input terminal is coupled to the output terminal of the ESD determination circuit 210 to receive the trigger signal TRG, the second input terminal is coupled to the output terminal of the ON-time control circuit 220 to receive the ON-time signal TON. Based on the trigger signal TRG and the ON-time signal TON, the logic control circuit 230 is configured to generate the clamp control signal VG at the output terminal.

When the rising time of the voltage between the node 201 and the node 202 is shorter than the first time threshold $\tau 1$, the logic control circuit 230 is triggered to turn ON the clamp switch 204. The clamp switch 204 is turned off when its ON-time reaches the second time threshold $\tau 2$.

In one embodiment, the logic control circuit 230 comprises a flip-flop. The flip-flop has a set terminal, a reset terminal and an output terminal. When the rising time is shorter than the first time threshold $\tau 1$, the trigger signal TRG provided by the ESD determination circuit 210 will be logical high and set the flip-flop to turn ON the clamp switch 204. When the ON-time of the clamp switch 204 reaches the second time threshold $\tau 2$, the ON-time control circuit 220 generates a high level signal to reset the flip-flop, and the clamp switch 204 is turned OFF. In other embodiments, the logic control circuit 230 may comprise any other circuit operative to implement such logic function.

Figure 3:
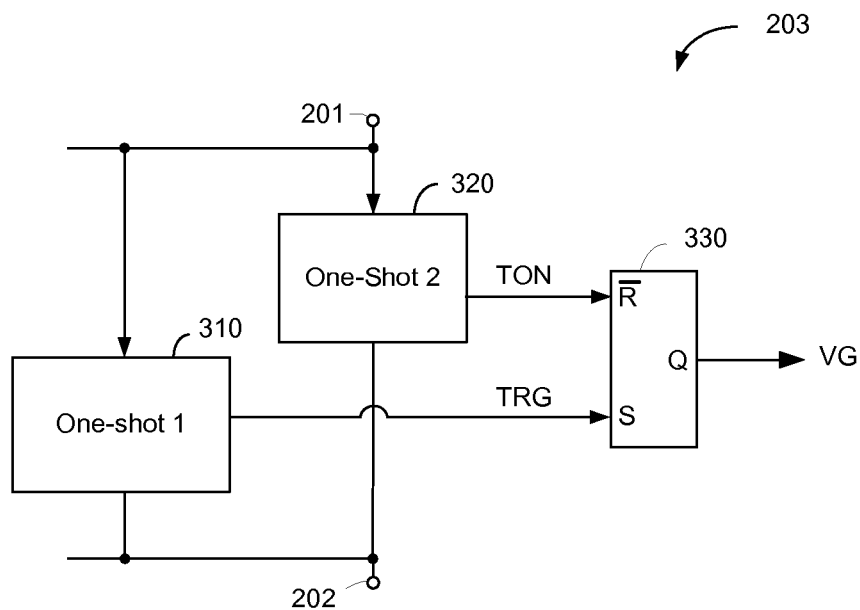
FIG. 3 schematically illustrates a clamp control circuit 203 in accordance with an embodiment of the present invention.

FIG. 3 schematically illustrates a clamp control circuit 203 in accordance with an embodiment of the present invention. In the embodiment shown in FIG. 3, the clamp control circuit 203 comprises a first one-shot circuit 310, a second one-shot circuit 320 and a flip-flop 330. The first one-shot circuit 310 is coupled between a node 301 and a node 302, and is configured to generate the trigger signal TRG to indicate whether an ESD event occurs. The second one-shot circuit 320 is coupled between the node 301 and the node 302, and is configured to generate the ON-time signal TON to control the ON-time of the clamp switch. The flip-flop 330 has a set terminal, a reset terminal and an output terminal, wherein the set terminal is coupled to the output terminal of the first one-shot circuit 310, the reset terminal is coupled to the output terminal of the second one-shot circuit 320, the output terminal is coupled to the control terminal of the clamp switch. The set terminal of the flip-flop 330 is designed as rising edge effective and the reset terminal is designed as falling edge effective. Based on the trigger signal TRG and the ON-time signal TON, the flip-flop 330 generates a clamp control signal VG to control the clamp switch.

When the rising time is shorter than the first time threshold $\tau 1$, the trigger signal TRG generated by the first one-shot circuit 310 is a pulse signal, which indicates the ESD event occurs. The pulse width of the trigger signal TRG is equal to the first time threshold $\tau 1$. The flip-flop 330 is set at the rising edge of the trigger signal TRG, the clamp control signal VG becomes logical high and the clamp switch 204 is turned ON. On the other hand, the rising time is also shorter than the second time threshold $\tau 2$, the ON-time signal TON generated by the second one-shot circuit 320 is a pulse signal and the pulse width of the ON-time signal TON is equal to the second time threshold $\tau 2$. The flip-flop 330 is reset at the falling edge of the ON-time signal TON, the clamp control signal VG becomes logical low and the clamp switch is turned OFF.

When the rising time is longer than the first time threshold $\tau 1$ and shorter than the second time threshold $\tau 2$, the trigger signal TRG generated by the first one-shot circuit 310 is logical low, which indicates no ESD event occurs. Even if the ON-time signal TON generated by the second one-shot circuit 320 is a pulse signal with the second time threshold τ2, the clamp control signal VG is maintained low and the clamp switch can not be turned ON.

Figure 4:
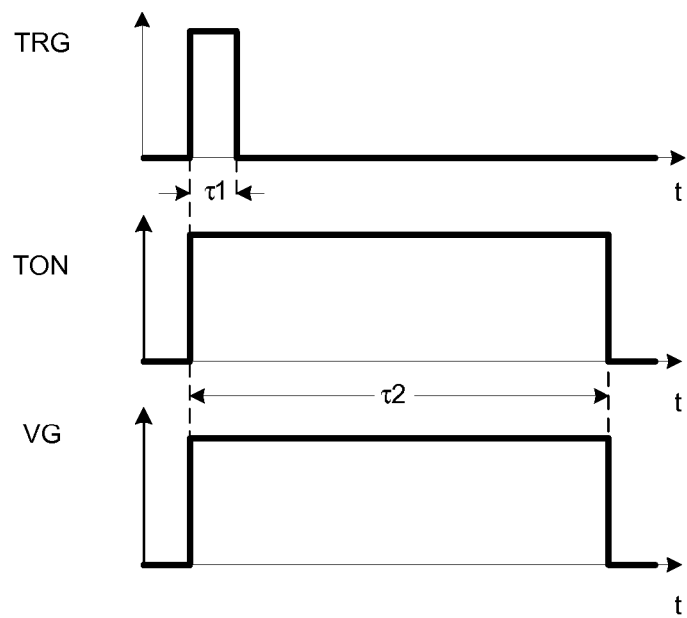
FIG. 4 illustrates several working waveforms of the clamp control circuit 203 shown in FIG. 3 when the rising time is shorter than the first time threshold τ1, in accordance with an embodiment of the present invention.

FIG. 4 illustrates several working waveforms of the clamp control circuit 203 shown in FIG. 3 when the rising time is shorter than the first time threshold τ1, in accordance with an embodiment of the present invention. As shown in FIG. 4, when the rising time is shorter than the first time threshold τ1, the trigger signal TRG is a pulse signal and its pulse width is equal to the first time threshold τ1. The ON-time signal TON is a pulse signal and its pulse width is equal to the second time threshold τ2. The clamp control signal VG will be logical high at the rising edge of the trigger signal TRG and finally will be logical low at the falling edge of the ON-time signal TON.

Figure 5:
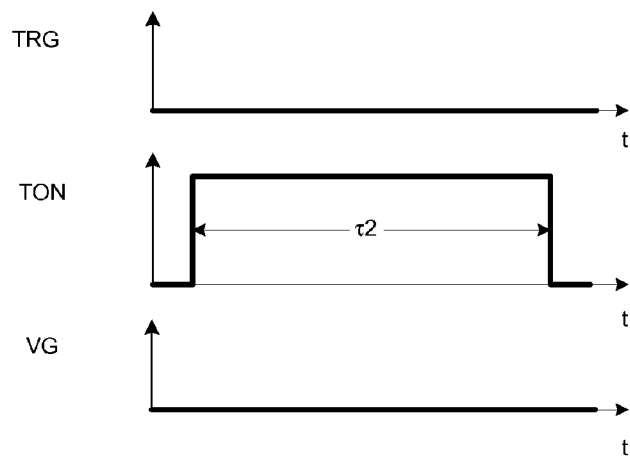
FIG. 5 illustrates several working waveforms of the clamp control circuit 203 shown in FIG. 3 when the rising time is between the first time threshold τ1 and the second time threshold τ2, in accordance with an embodiment of the present invention.

FIG. 5 illustrates several working waveforms of the clamp control circuit 203 shown in FIG. 3 when the rising time is between the first time threshold τ1 and the second time threshold τ2, in accordance with an embodiment of the present invention. As shown in FIG. 5, when the rising time is longer than the first time threshold τ1 and shorter than the second time threshold τ2, the trigger signal TRG is logical low. Even if the ON-time signal TON is a pulse signal with the second time threshold τ2, the clamp control signal VG is maintained low.

Figure 6:
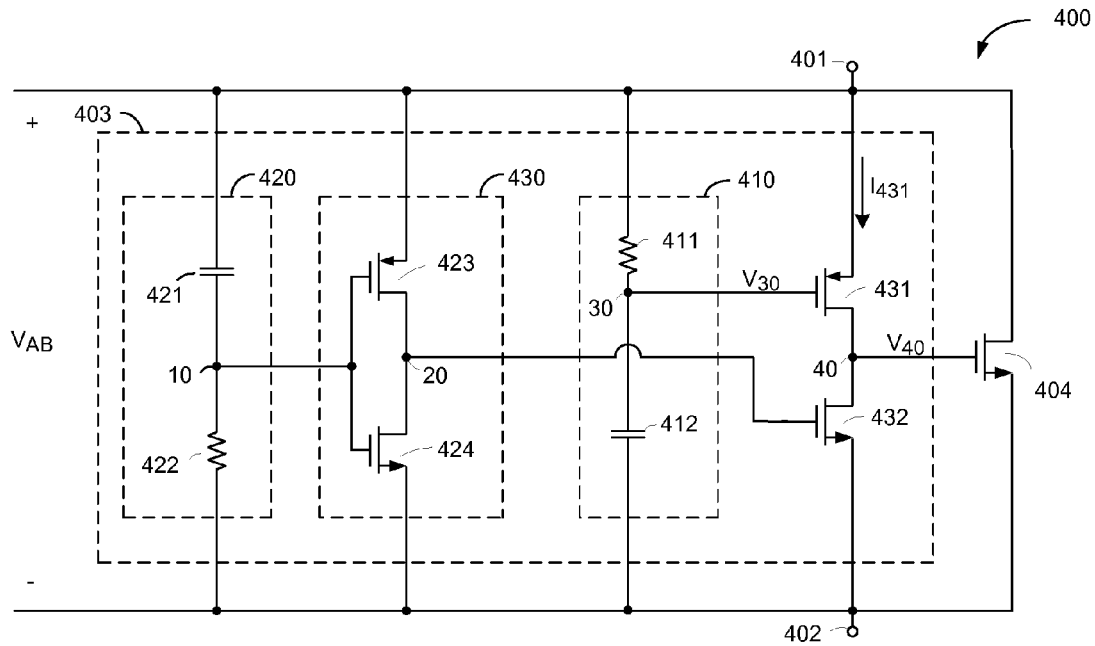
FIG. 6 schematically illustrates an ESD protection circuit 400 in accordance with another embodiment of the present invention.

FIG. 6 schematically illustrates an ESD protection circuit 400 in accordance with another embodiment of the present invention. The ESD protection circuit 400 comprising a clamp switch 404 and a clamp control circuit 403 is coupled between a node 401 and a node 402. The clamp control circuit 403 comprises a first timer 410 having an output terminal, a second timer 420 having an output terminal, an inverter 430 having an input terminal and an output terminal, a PMOS transistor 431 and a NMOS transistor 432.

The first timer 410 is coupled between the node 401 and the node 402 and is configured to set the first time threshold τ1 for ESD detection. The first timer 410 comprises a resistor 411 and a capacitor 412. The resistor 411 has a first end and a second end, wherein the first end is coupled to the node 401. The capacitor 412 has a first end and a second end, wherein the first end is coupled to the second end of the resistor 411 and the second end is coupled to the node 402. The common node 30 of the resistor 411 and the capacitor 432 is configured as the output terminal of the first timer 410.

The second timer 420 is coupled between the node 401 and the node 402 and is configured to set the second time threshold τ2 for ON-time control of the clamp switch 404. The second timer 420 comprises a capacitor 421 and a resistor 422. The capacitor 421 has a first end and a second end, wherein the first end is coupled to the node 401. The resistor 422 has a first end and a second end, wherein the first end is coupled to the second end of the capacitor 421 and the second end is coupled to the node 402. The common node 10 of the resistor 422 and the capacitor 421 is configured as the output terminal of the second timer 420 and is coupled to the input terminal of the inverter 430.

As shown in the embodiment of FIG. 5, the topology of the second timer 420 is similar to that of the first timer 410. However, their time thresholds are very different. The first time threshold τ1 is much shorter than the second time threshold τ2, and the first timer 410 requires much smaller resistor and capacitor.

The inverter 430 comprises a CMOS inverter consisting of a PMOS transistor 423 and a NMOS transistor 424. The PMOS transistor 423 has a source terminal, a drain terminal and a gate terminal, wherein the source terminal is connected to the node 401, the gate terminal is connected to the node 10. The NMOS transistor 424 has a source terminal, a drain terminal and a gate terminal, wherein the source terminal is connected to the node 402, the gate terminal is connected to the node 10. The drain terminals of the PMOS transistor 423 and NMOS transistor 424 are coupled together to form a common node 20 which is configured as the output terminal of the inverter 430. Although a CMOS inverter is utilized in the embodiment shown in FIG. 6, persons of ordinary skill in the art will recognize that other logic circuits, such as NOT gate, may also be used as the inverter 430.

In some applications, the second timer 420 comprises a capacitor and a current source. The capacitor has a first end and a second end, wherein the first end is coupled to the node 401. The current source has a first end and a second end, wherein the first end is coupled to the second end of the capacitor and the second end is coupled to the node 402.

The PMOS transistor 431 and the NMOS transistor 432 are connected in series. The PMOS transistor 431 has a source terminal, a drain terminal and a gate terminal, wherein the source terminal is connected to the node 401, the gate terminal is connected to the output terminal of the first timer 410. The NMOS transistor 432 has a source terminal, a drain terminal and a gate terminal, wherein the source terminal is connected to the node 402, the gate terminal is connected to the output terminal of the inverter 430. The drain terminals of the PMOS transistor 431 and the NMOS transistor 432 are coupled together to form a common node 40 which is coupled to the control terminal of the clamp switch 404. The working principle of the clamp control circuit 403 is described in detail below with reference to FIGS. 7 and 8.

Figure 7:
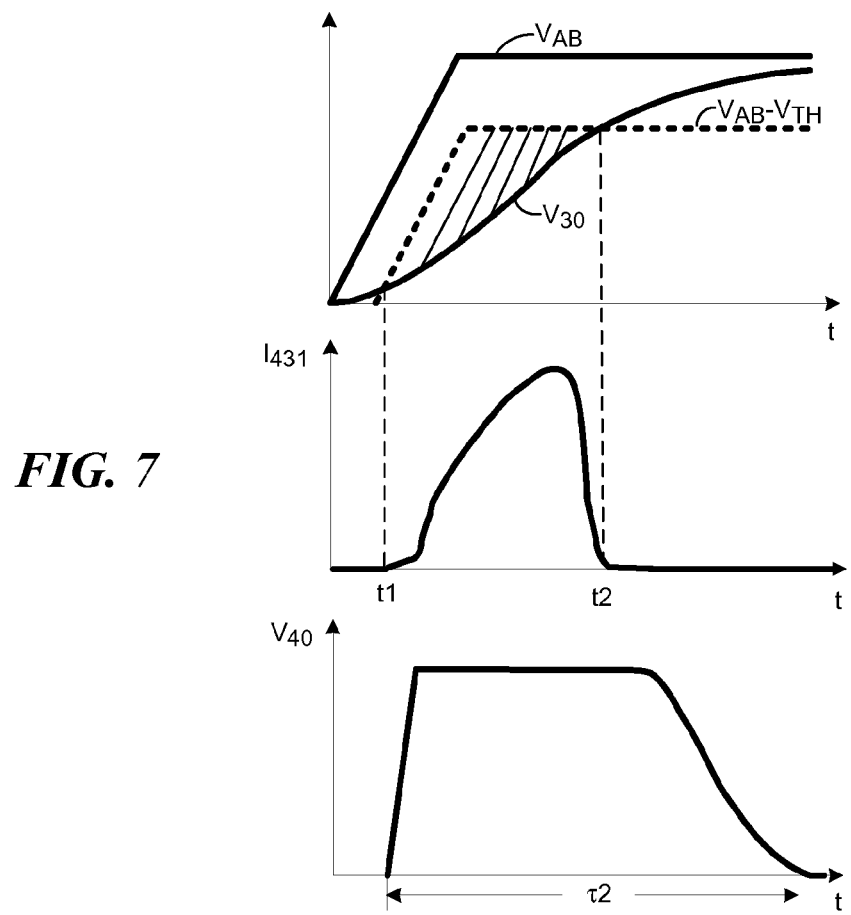
FIG. 7 illustrates several working waveforms of the ESD protection circuit shown in FIG. 6 when the rising time is shorter than the first time threshold τ1, in accordance with an embodiment of the present invention.

FIG. 7 illustrates several working waveforms of the ESD protection circuit shown in FIG. 6 when the rising time is shorter than the first time threshold τ1, in accordance with an embodiment of the present invention. The voltage $V_{AB}$ represents the voltage between the node 401 and the node 402. The voltage $V_{30}$ represents the voltage of the node 30. The voltage $V_{TH}$ represents the threshold voltage of the PMOS transistor 431. The current $I_{431}$ represents the current flowing through the PMOS transistor 431. The voltage $V_{40}$ represents the voltage of the node 40.

When the rising time is shorter than the first time threshold τ1, as shown in FIG. 7, the voltage $V_{AB}$ rises to a certain voltage quickly. The voltage of the node 30 ($V_{30}$) is initially zero and starts to track the voltage $V_{AB}$. Since the threshold voltage $V_{TH}$ of the PMOS transistor 431 is constant, the difference between the Voltage $V_{AB}$ and $V_{TH}$ is shown as the dashed line in FIG. 7. When the voltage $V_{30}$ is lower than the difference between the voltage $V_{AB}$ and the voltage $V_{TH}$ at τ1, the PMOS transistor 431 is turned ON. The voltage of the node 40 is increased to the certain voltage accordingly. The clamp switch 404 is turned ON to discharge the ESD energy between the node 401 and the node 402.

On the other hand, when the ESD event occurs, the second timer 420 along with the inverter 430 pulls down the voltage of the node 20 for a second time threshold τ2 which is much longer than the ON-time of the PMOS transistor 431. The NMOS 432 can not be turned on during the second time threshold τ2.

When the voltage $V_{30}$ becomes larger than the difference between the voltage $V_{AB}$ and the voltage $V_{TH}$ at τ2, the PMOS transistor 431 is turned OFF. Since the NMOS 432 can not be turned ON during the second time threshold τ2, the voltage of the node 40 ($V_{40}$) is maintained and the clamp switch won't be turned OFF until the end of the second time threshold τ2.

Figure 8:
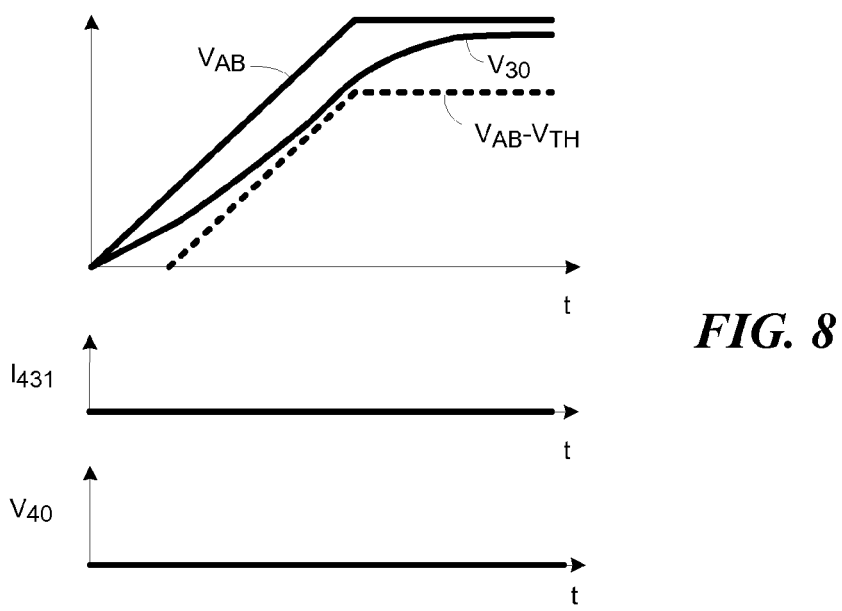
FIG. 8 illustrates several working waveforms of the ESD protection circuit shown in FIG. 6 when the rising time is longer than the first time threshold τ1, in accordance with an embodiment of the present invention.

FIG. 8 illustrates several working waveforms of the ESD protection circuit shown in FIG. 6 when the rising time is longer than the first time threshold τ1, in accordance with an embodiment of the present invention. When the rising time is longer than the first time threshold τ1, as shown in FIG. 8, the voltage of the node 30 $V_{30}$ will always exceeds the difference between the voltage $V_{AB}$ and the voltage $V_{TH}$. Therefore, the PMOS transistor 431 cannot be turned ON. The current flowing through the PMOS transistor ($I_{431}$) is substantially zero. Even if the rising time is shorter than the second time threshold τ2 and the NMOS transistor 432 is trying to turn OFF by the voltage of the node 20, the voltage of the node 40 ($V_{40}$) will not rise at all and the clamp switch 404 cannot be turned ON. Since the first time threshold τ1 (e.g., 10 ns~100 ns) is designed to be smaller than the rising time in hot-swap event, the false triggering of the clamp switch 404 in hot-swap event is eliminated.

Figure 9:
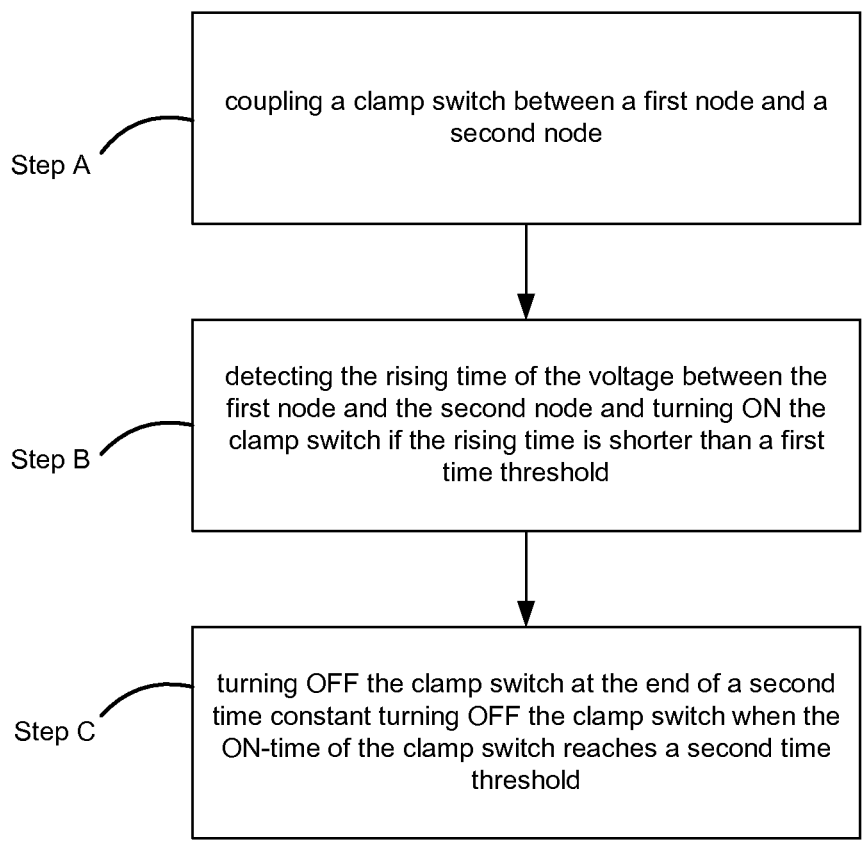
FIG. 9 is a flow chart of a method for providing ESD discharge path between a first node and a second node, in accordance with an embodiment of the present invention.

FIG. 9 is a flow chart of a method for providing an ESD discharge path between a first node and a second node, in accordance with an embodiment of the present invention. The method comprises steps A~C.

At step A, a clamp switch is coupled between the first node and the second node.

At step B, the rising time of the voltage between the first node and the second node is detected to determine whether an ESD event occurs. The clamp witch is turned ON if the rising time is shorter than a first time threshold.

At step C, the clamp switch is turned OFF when the ON-time of the clamp switch reaches a second time threshold, wherein the first time threshold is shorter than the second time threshold.

In one embodiment, the step B comprises: when the rising time is shorter than the first time threshold, a first pulse signal is generated, and the clamp switch is turned ON at the rising edge of the first pulse signal. The step C comprises: when the rising time is shorter than the second time threshold, a second pulse signal is generated and the pulse width of the second pulse signal is equal to the second time threshold; and the clamp switch is turned OFF at the falling edge of the second pulse signal.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. An Electrostatic discharge (ESD) protection circuit, comprising:
    a clamp switch, having a first terminal, a second terminal and a control terminal, wherein the first terminal is coupled to a first node, and the second terminal is coupled to a second node; and
    a clamp control circuit coupled between the first node and the second node, wherein the clamp control circuit is configured to detect the rising time of the voltage between the first node and the second node, and to provide a clamp control signal to the control terminal of the clamp switch based on the rising time, the clamp control circuit comprises:
        an ESD determination circuit coupled between the first node and the second node, the ESD determination circuit has an output terminal configured to generate a trigger signal, wherein when the rising time is shorter than a first time threshold, the trigger signal is a pulse signal and the pulse width of the trigger signal is equal to the first time threshold;
        an ON-time control circuit coupled between the first node and the second node, the ON-time control circuit has an output terminal configured to generate an ON-time signal, when the rising time is shorter than a second time threshold, the ON-time signal is a pulse signal and the pulse width of the ON-time signal is equal to the second time threshold;
        a flip-flop having a set terminal, a reset terminal and an output terminal, and wherein the set terminal is coupled to the output terminal of the ESD determination circuit to receive the trigger signal, the reset terminal is coupled to the output terminal of the ON-time control circuit to receive the ON-time signal, and the output terminal is coupled to the control terminal of the clamp switch to provide the clamp control signal; and wherein
    when the rising time is shorter than the first time threshold, the clamp switch is turned ON for the second time threshold, and wherein the first time threshold is shorter than the second time threshold.

2. The ESD protection circuit of claim 1, wherein the first node is configured as a power supply pin, and the second node is configured as a ground pin.

3. The ESD protection circuit of claim 1, the clamp switch comprises a NMOS transistor.

* * * * *